(No Model.)
N. NELSON.
LATHE TOOL HOLDER.
No. 567,685.  Patented Sept. 15, 1896.
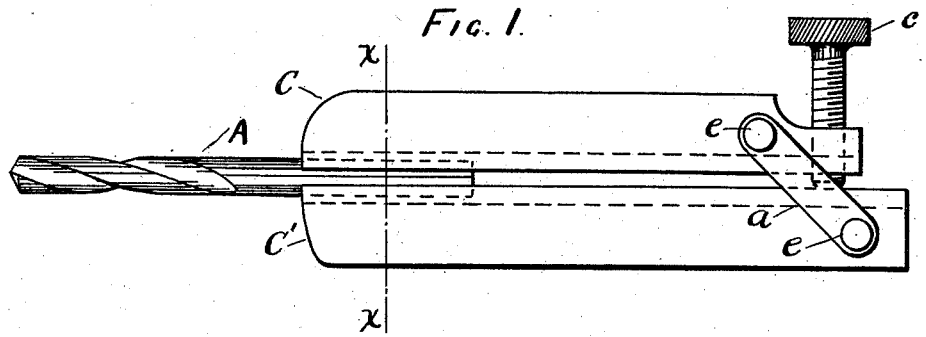
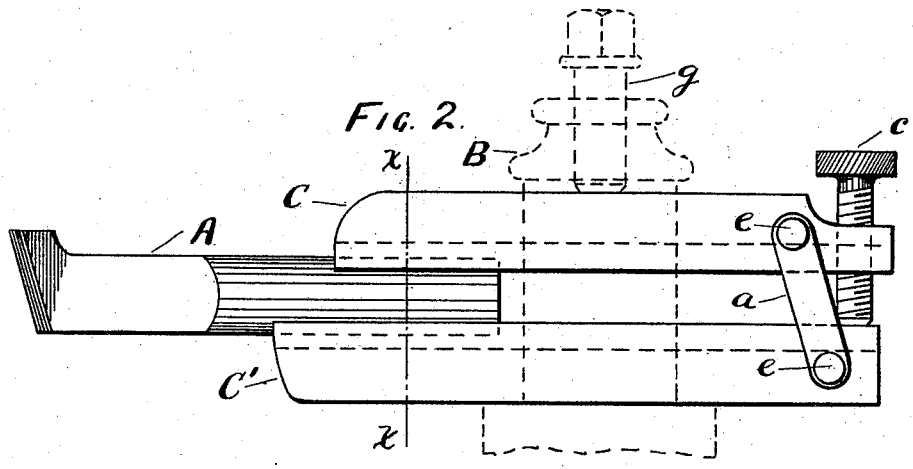
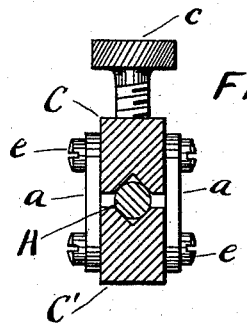
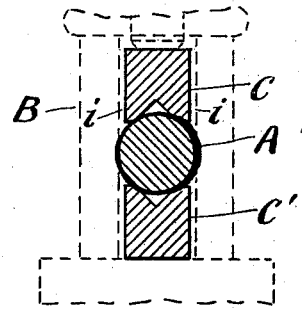
Witnesses:  Inventor.
S. M. Snow  Nels Nilson
James W. Richardson  By Benj Arnold
  Attorney.

UNITED STATES PATENT OFFICE.

NELS NELSON, OF ATTLEBOROUGH, MASSACHUSETTS, ASSIGNOR OF ONE-HALF TO PER A. ARONSSON, OF SAME PLACE.

LATHE TOOL-HOLDER.

SPECIFICATION forming part of Letters Patent No. 567,685, dated September 15, 1896.

Application filed May 2, 1896. Serial No. 589,974. (No model.)

*To all whom it may concern:*

Be it known that I, NELS NELSON, of Attleborough, in the county of Bristol and State of Massachusetts, have invented certain new and useful Improvements in Lathe Tool-Holders; and I do hereby declare that the following is a full, clear, and exact description thereof, reference being had to the accompanying drawings, and to the letters of reference marked thereon, which form a part of this specification.

This invention relates to that class of tools used to hold drills and turning-tools in lathes. It is fully explained and illustrated in this specification and the accompanying drawings.

Figure 1 is a front elevation of the tool-holder with a drill. Fig. 2 represents the tool-holder in position in a tool-post of a lathe shown in dotted lines, with a turning-tool in the holder. Fig. 3 is a vertical cross-section of the tool-holder on line $x\ x$, Fig. 1. Fig. 4 shows a vertical cross-section of the tool-holder with a large tool in it and part of a tool-post in dotted lines.

The object of this invention is to make an appliance to hold drills or turning-tools in the tool-post of a lathe to operate on work held in a chuck or on the chuck-plate of a lathe.

It consists of two bars of metal C C', of proper dimensions to go in the slot of a lathe-tool post together and still be capable of being separated to the required distance apart to receive a tool between them. The back ends of the two bars C C' are connected together by two links $a\ a$, one on each side of the bars, and of sufficient length to allow the bars to separate, so as to receive a tool between them. These links $a\ a$ are riveted at their upper and lower ends to the bars C C', respectively, near their ends in such manner as to allow the bars to swing on the rivets $e$ as they move to and from each other.

A screw $c$, having a milled head to turn it by, is fitted to screw down through the back end of the upper bar C and bear against the lower bar C'. The object of the screw $c$ is to hold the back ends of the bars at any distance apart that may be required, according to the size of the tool to be held between them, to keep the bars parallel to each other, so as to take a firm hold of the tool A. Sometimes it is necessary to draw the tool out as far from the bars as possible and hold it, or it may be too large to go in the slot $i$ of the tool-post, as in Fig. 4. It is obvious that if the tool A does not go into the tool-post B so as to come under the set-screw $g$, and there is nothing to hold the back ends of the bars apart when the set-screw $g$ is screwed down, the back ends will close and the front ends open, and then the bars would have a hold on the back end only of the tool, and would not hold it; but by turning down the screw $c$ so as to hold the back ends of the bars apart the same distance that the tool does, as in Fig. 2, when the set-screw $g$ is screwed down the bars will bear on all that part of the tool between them and insure a good hold, though that portion may be quite short.

Having thus described my improvement, I claim as my invention and desire to secure by Letters Patent—

As an article of manufacture, a tool-holder for lathes, consisting of two bars of metal fitted to go together edgewise in a tool-post, two links to connect said bars together at one end, each of said links being pivoted at its upper end to the upper bar, and at the lower end to the lower bar, a screw fitted to screw through one of said bars at the end opposite to the clamping end and back of the connecting-links to bear upon the other bar near its end, all in combination, substantially as herein set forth.

In testimony whereof I have hereunto set my hand this 30th day of April, A. D. 1896.

NELS NELSON.

In presence of—
BENJ. ARNOLD,
JAMES E. ARNOLD.